(12) United States Patent
Carter

(10) Patent No.: US 6,862,206 B1
(45) Date of Patent: Mar. 1, 2005

(54) MEMORY MODULE HYBRIDIZING AN ATOMIC RESOLUTION STORAGE (ARS) MEMORY AND A MAGNETIC MEMORY

(75) Inventor: Timothy L. Carter, Caldwell, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/742,195

(22) Filed: Dec. 19, 2003

(51) Int. Cl.⁷ .............................................. G11C 13/00
(52) U.S. Cl. ..................... 365/151; 365/118; 365/171; 365/173
(58) Field of Search .................. 365/118, 106, 365/151, 171, 173

(56) References Cited

U.S. PATENT DOCUMENTS

| | | | |
|---|---|---|---|
| 5,265,046 A | * 11/1993 | Fuchs et al. .................. 365/151 |
| 5,557,596 A | * 9/1996 | Gibson et al. .................. 369/101 |
| 6,169,686 B1 | 1/2001 | Brug et al. .................. 365/171 |
| 6,385,075 B1 | 5/2002 | Taussig et al. .................. 365/105 |
| 6,522,566 B2 | 2/2003 | Carter .................. 365/118 |
| 6,590,804 B1 | * 7/2003 | Perner .................. 365/158 |
| 6,646,912 B2 | * 11/2003 | Hurst et al. .................. 365/175 |
| 6,754,123 B2 | * 6/2004 | Perner et al. .................. 365/209 |
| 2002/0196659 A1 | 12/2002 | Hurst et al. .................. 365/175 |

* cited by examiner

Primary Examiner—Andrew Q. Tran

(57) ABSTRACT

A semiconductor memory module comprising an atomic resolution storage memory, a magnetic memory, and a memory controller. The memory controller is configured to move data between the memory controller and the atomic resolution storage memory and configured to move data between the memory controller and the magnetic memory.

40 Claims, 4 Drawing Sheets

MEMORY MODULE HYBRIDIZING AN ATOMIC RESOLUTION STORAGE (ARS) MEMORY AND A MAGNETIC MEMORY

BACKGROUND OF THE INVENTION

Three types of memory storage devices are atomic resolution storage (ARS) devices, magnetic memory devices, such as magnetic random access memory (MRAM) devices, and portable, inexpensive, rugged memory (PIRM) devices. All three types of memory devices are nonvolatile memory, yet each possesses unique properties that make each memory device advantageous for use in a particular application.

An ARS memory is a nonvolatile memory that is capable of storing large amounts of information on a single semiconductor chip. ARS memory employs a number of electron emitters or contact probe tips located proximate a storage medium. A micromover is utilized to move an electron emitter relative to a storage location on the storage medium to read and write data at the storage location.

A magnetic memory is a nonvolatile semiconductor memory that can provide faster data access relative to an ARS memory. Memory storage devices employing magnetic memory technologies include memory cells that provide resistance values that correspond to logic states, such as logic "0" or logic "1". A typical magnetic memory comprises one or more arrays of magnetic memory cells for storing data as logic states. One exemplary type of magnetic memory is magnetic random access memory (MRAM).

A PIRM is a nonvolatile memory that can provide high capacity write-once memory at low cost. This is realized in part by avoiding silicon substrates, minimizing process complexity and lowering area density. The memory device is formed of a laminated stack of integrated circuit layers constructed on plastic substrates. Each layer contains a cross-point diode memory array for storing data represented by low and high impedance logic states.

Typically, a memory storage device, such as an ARS memory, is provided as a separate or independent unit that is configured to electrically communicate with another device, such as a microprocessor, via various leads or interconnects. Thus, when a memory storage device and another device with which the memory storage device is to be used are combined in a circuit assembly, such as on a printed circuit board (PCB), such an arrangement requires that both the memory storage device and the other device be individually placed on and affixed to the PCB. The various leads or other interconnects for enabling electrical communication between the devices may then be applied.

SUMMARY OF THE INVENTION

One embodiment of the present invention provides a semiconductor memory module. The semiconductor memory module comprises an atomic resolution storage memory, a magnetic memory, and a memory controller. The memory controller is configured to move data between the memory controller and the atomic resolution storage memory and configured to move data between the memory controller and the magnetic memory.

DETAILED DESCRIPTION

Figure 1:
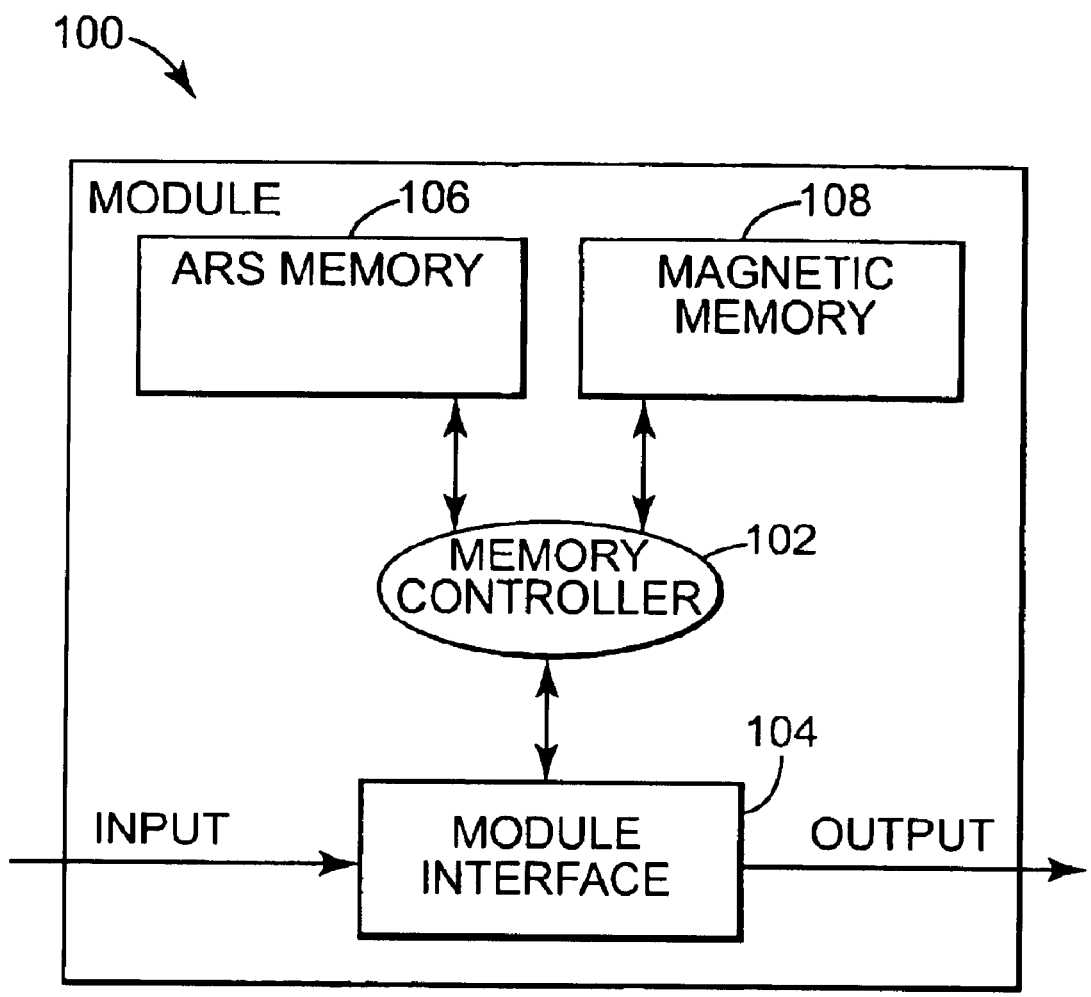
FIG. 1 is a block diagram illustrating an embodiment of a memory module including ARS memory and magnetic memory.

Embodiments of the invention are better understood with reference to the following drawings. The elements of the drawings are not necessarily to scale relative to each other. Like reference numerals designate corresponding similar parts.

FIG. 1 is a block diagram illustrating an embodiment of a memory module 100. Memory module 100 is formed on a single semiconductor device. Memory module 100 includes memory controller 102, module interface 104, ARS memory 106, and magnetic memory 108. Memory controller 102 is communicatively coupled with module interface 104 for facilitating communication between components internal to memory module 100 and components external to memory module 100 (e.g., a host device). Memory controller 102 is also communicatively coupled with ARS memory 106 and magnetic memory 108 for facilitating storage and retrieval of data stored within ARS memory 106 and magnetic memory 108. ARS memory 106 and magnetic memory 108 may comprise one or more memory components.

Memory controller 102 comprises semiconductor hardware, software, or a combination of hardware and software. Memory controller 102 operates to move data between ARS memory 106 and magnetic memory 108, and a host or external device (not shown) via module interface 104. In one embodiment, memory controller 102 is configured to function as a microprocessor. Module interface 104 may provide mechanical, electrical, or both mechanical and electrical coupling to an external device, such as a host. For example, module interface 104 may include pins extending from a chip adapted for mounting onto a PCB or module interface 104 may include a male or female connector adapted for coupling to a female or male connector. In addition, module interface 104 may be permanently or removably coupled to an external device.

In one embodiment, ARS memory 106 is used for large capacity data storage while a smaller magnetic memory 108 is used as a buffer for the data stored in ARS memory 106. Magnetic memory 108 has a relatively faster access time than ARS memory 106, therefore magnetic memory 108 is well suited for use as a memory buffer. Memory controller 102 controls the transfer of data between ARS memory 106 and magnetic memory 108. Memory controller 102 also provides requested data to a host or external device through module interface 104. In addition, memory controller 102 may write data to ARS memory 106 and magnetic memory 108 based on a request from a host or external device. In one embodiment, memory controller 102 uses look ahead control logic to anticipate what data in ARS memory 106 will be requested by a host or external device and transfers that data to magnetic memory 108.

ARS memory 106 and magnetic memory 108 may have bad sectors or imperfections where data cannot be stored. To overcome these imperfections, memory controller 102 may translate referenced addresses from a host or external device to physical addresses where the data is actually stored or where the data may be written to in ARS memory 106 and magnetic memory 108.

In another embodiment, memory module 100 may include PIRM memory, which will be discussed in further detail in reference to FIGS. 3 and 4. PIRM memory may be used as read once, write many (WORM) memory or as read only memory (ROM) for storing commands or data used in the operation of memory module 100. In this embodiment, ARS memory 106 may be used as WORM memory for data archiving while magnetic memory 108 may be used as RAM memory for multiple read and write access, and ARS 106 memory is used as a relatively low speed RAM memory for multiple read and write access.

Figure 2:
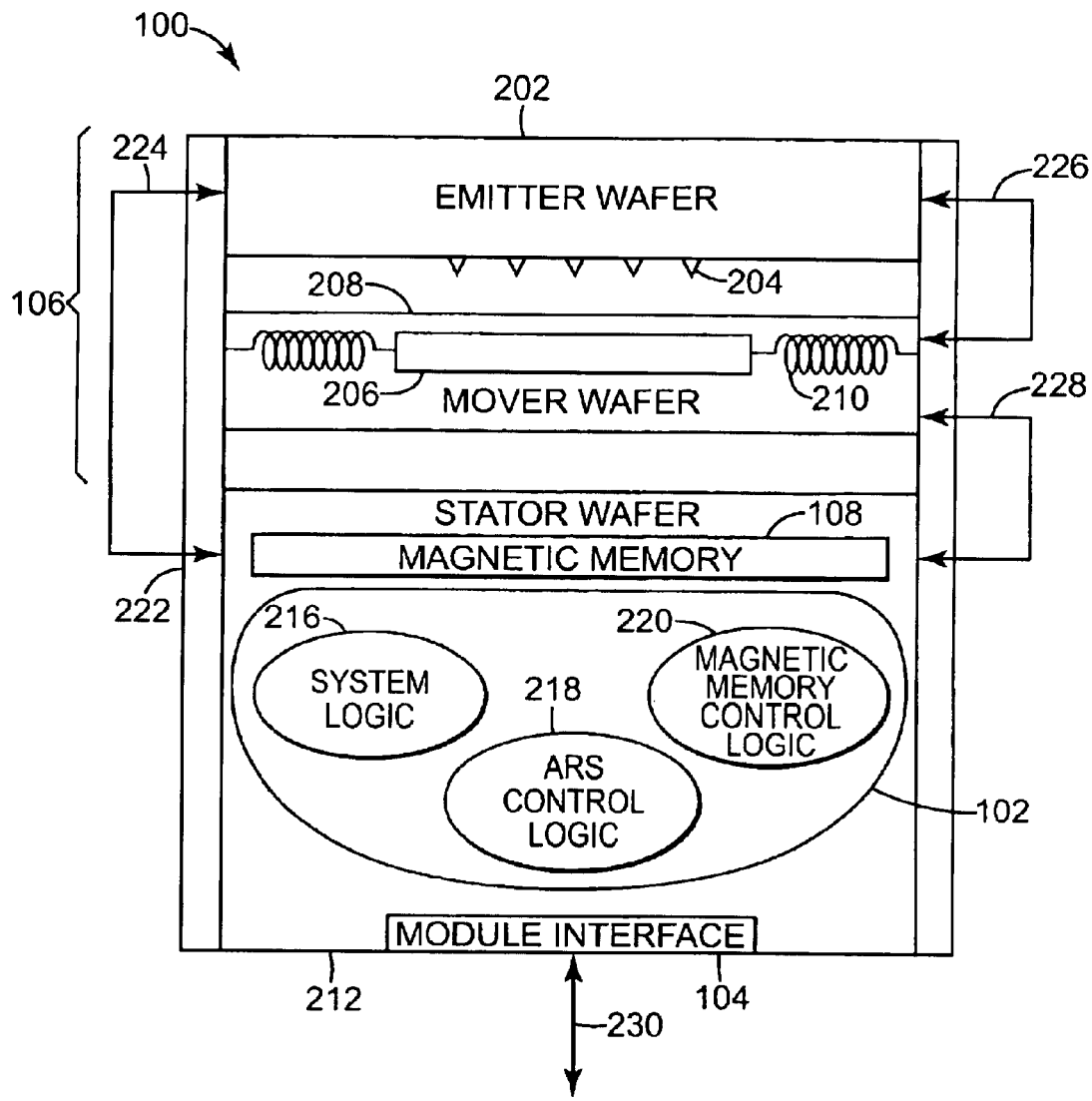
FIG. 2 is a diagram illustrating an embodiment of a semiconductor memory module including ARS memory and magnetic memory.

FIG. 2 is a diagram illustrating an embodiment of the memory module of FIG. 1 in more detail, illustrated as semiconductor memory module 100. Module 100 includes medium detection wafer 202, mover wafer 208, stator wafer 212, and housing 222. As utilized herein, the term "wafer" refers to a substrate, platform or other suitable structure that is adapted for facilitating component placement and/or mounting. In one embodiment, medium detection wafer 202 may also be a signal detection wafer. Examples of medium detection wafer 202 are emitter wafers or probe tip wafers. Medium detection wafer 202 can be utilized in conjunction with numerous mediums, such as polymers, phase change mediums, magnetic mediums, and ferro-electric mediums.

Medium detection wafer 202 includes a plurality of field emitters 204. Medium detection wafer 202 may be configured as a substrate, platform or other suitable structure that is adapted for facilitating placement and/or mounting of field emitters 204. In one embodiment, medium detection wafer 202 is configured as a slab of material, i.e., medium detection wafer 202 incorporates a generally planar structure, which is formed, at least partially, of a conventional semiconductor substrate material, e.g., silicon.

Mover wafer 208, arranged proximate medium detection wafer 202, includes storage medium 206 and micromover 210, which is represented by springs. Emitters 204 of medium detection wafer 202 are arranged in proximity to storage medium 206 of mover wafer 208. Emitters 204 and storage medium 206 are configured to move relative to each other. In one embodiment, micromover 210 of mover wafer 208 includes various components, which are adapted to move storage medium 206 relative to emitters 204. In other embodiments, emitters 204 may be configured to move relative to storage medium 206, while storage medium 206 is retained in position.

Stator wafer 212 is arranged proximate to mover wafer 208 and medium detection wafer 202 (mover wafer 208 and medium detection wafer 202 may be collectively referred to as ARS memory 106). In one embodiment, stator wafer 212 includes magnetic memory 108, memory controller 102, and module interface 104. Magnetic memory 108 may be overlaid on stator wafer 212. Memory controller 102 may include logic components, software, and/or circuitry, to facilitate various functionalities of module 100, such as system logic 216, ARS control logic 218, and magnetic memory control logic 220. System logic 216 may facilitate functionality of a processor (e.g., a microprocessor) so that module 100 may serve as a microprocessor device. Various other functionalities may be employed in other embodiments, such as those typically implemented by semiconductors. In addition, ARS control logic 218 may facilitate functionality of ARS memory 106, thereby enabling reading of data from and writing of data to ARS memory 106. Likewise, magnetic memory control logic 220 may facilitate functionality of magnetic memory 108, thereby enabling reading of data from and writing of data to magnetic memory 108. Housing 222 is provided to maintain the placement, e.g., spaced arrangement, and/or alignment of the various wafers of module 100. Housing 222 at least partially encases the wafers. In other embodiments, various configurations not utilizing a housing may be utilized for maintaining proper positioning of the wafers relative to each other, thereby facilitating proper functioning of the various ARS memory storage components.

Intercommunication of the various wafers of module 100 also may be provided in various configurations. Representative examples of communication links are schematically depicted in FIG. 2. In one embodiment, the communication links are conductive traces. They include: communication link 224 (enabling electrical communication between stator wafer 212 and medium detection wafer 202), communication link 226 (enabling electrical communication between medium detection wafer 202 and mover wafer 208), and communication link 228 (enabling electrical communication between mover wafer 208 and stator wafer 212). In addition, communication link 230 may be configured for enabling electrical communication of module 100, through module interface 104, with components external to the module, such as a host.

During operation of ARS memory 106, a predetermined potential difference is applied between a field emitter 204 and a corresponding gate (not shown) that extracts an electron beam current from the emitter 204 towards a storage area (not shown) on storage medium 206. Writing of data from an emitter 204 to a storage area is accomplished by ARS control logic 218 by temporarily increasing the power density of the electron beam current to modify the structural state of the surface of the storage area into one of a plurality of states. In contrast, reading data from the storage area is accomplished via ARS control logic 218 by detecting the effect of the storage area on the electron beam of the emitter, or the effect of the electron beam on the storage area. More specifically, in a read operation, an electron beam with a lower power density than that of the electron beam utilized for writing data to the storage area is applied to the storage medium. The read operation typically is accomplished by collecting secondary and/or backscattered electrons when an electron beam is applied to the storage medium.

ARS storage medium 206 is formed of material characterized by a structural state that can be changed from crystalline to amorphous by a beam of electrons. Since the amorphous state has a different secondary electron emission coefficient (SEEC) and backscattered electron coefficient (BEC) than the crystalline state, a different number of secondary and backscattered electrons are emitted from each storage area, in response to an electron beam, depending upon the current structural state of that storage area. Thus, by measuring the number of secondary and backscattered electrons, the structural state of the storage area and, therefore, the data stored by the storage area, may be determined. A suitable ARS memory for use with this invention is described in U.S. Pat. No. 5,557,596 to Gibson et al., issued Sep. 17, 1996, entitled "Ultra-High Density Storage Device," which is incorporated herein by reference.

Magnetic memory 108 includes memory cells (not shown) that provide a resistance value that corresponds to logic states, such as logic "0" or logic "1". Magnetic memory cells include a layer of magnetic film in which the magnetization of the magnetic film is alterable and a layer of magnetic film in which the magnetization is fixed or "pinned" in a particular direction. The magnetic film having alterable magnetization is referred to as a sense layer, and the magnetic film that is pinned, is referred to as a reference layer. Magnetic memory 108 includes an array of magnetic memory cells. Word lines extend along rows of the magnetic memory cells, and bit lines extend along columns of the magnetic memory cells. Each magnetic memory cell is located at an intersection of a word line and a bit line. A magnetic memory cell is written to a logic state by magnetic memory control logic 220 by applying magnetic fields that rotate the orientation of magnetization in the sense layer. The logic state of a magnetic memory cell is indicated by the resistance through the memory cell, which depends on the relative orientations of magnetization in the sense layer and reference layer.

Magnetic memory control logic 220 is used to sense the resistance state of a selected magnetic memory cell to determine the logic state stored in the memory cell. For example, the resistance state can be sensed by applying a voltage to a selected memory cell and measuring a sense current that flows through the memory cell. The resistance is proportional to the sense current and the state of the memory cell. Suitable magnetic memory for use with this invention is described in U.S. Pat. No. 6,169,686 to Brug et al., issued Jan. 2, 2001, entitled "Solid-State Memory with Magnetic Storage Cells," which is incorporated herein by reference.

Figure 3:
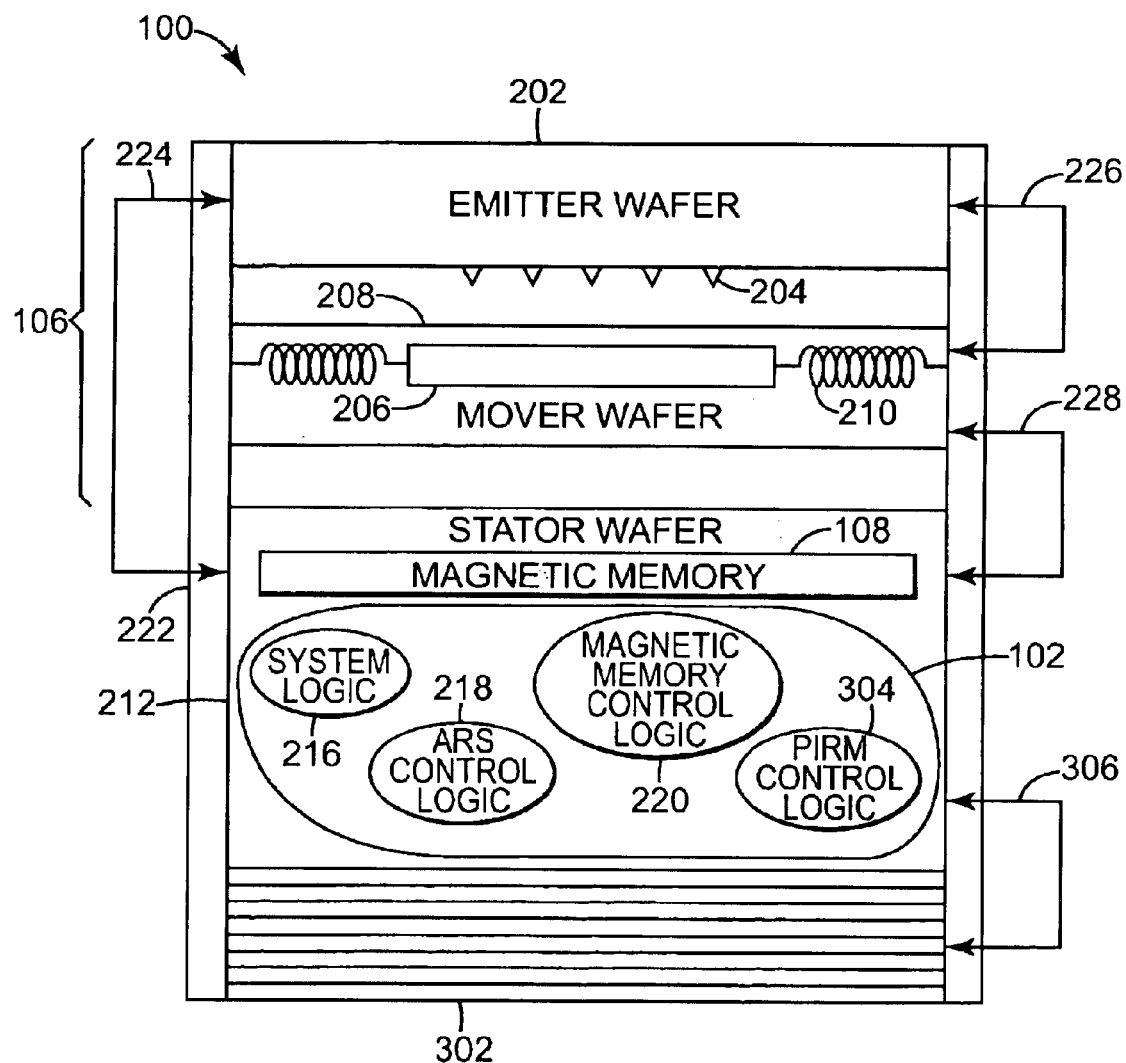
FIG. 3 is a diagram illustrating an embodiment of a semiconductor memory module including ARS memory, magnetic memory, and PIRM memory.

FIG. 3 is a diagram illustrating another embodiment of the memory module of FIG. 1. FIG. 3 illustrates the same semiconductor module of FIG. 2, but with the addition of PIRM. Module 100 adds PIRM 302, PIRM control logic 304, and communication link 306. PIRM control logic 304 may facilitate functionality of PIRM 302, thereby enabling reading of data from and writing of data to PIRM 302. Added communication link 306 enables electrical communication between stator wafer 212 and PIRM 302. PIRM 302 is arranged proximate stator wafer 212. In other embodiments, PIRM 302 may be arranged proximate medium detection wafer 202.

PIRM 302 is formed of a laminated stack of integrated circuit layers constructed on plastic substrates. Each layer contains a cross-point diode memory array. Each memory element within each memory array can be switched between low and high impedance states, representing respective binary data states, by application of a write signal from PIRM control logic 304 in the form of a predetermined current density through the memory element. Sensing of the data stored in the memory array is performed by PIRM control logic 304. A PIRM suitable for use with this invention is described in U.S. patent application Ser. No. 09/875,356 to Hurst et al., Publication No. 2002/0196659, published Dec. 26, 2002, entitled "Non-Volatile Memory," which is incorporated herein by reference.

In FIG. 3, communication link 230 and module interface 104 are not shown for clarity purposes. However, it is understood that communication link 230 and module interface 104 may be included in semiconductor module 100 shown in FIG. 3. As with reference to FIG. 2, communication link 230 may enable electrical communication of module 100, through module interface 104, with components exterior to the module, such as a host.

The memory modules depicted in FIGS. 2 and 3 may be utilized in systems, apparatuses, or devices, such as computer-based systems, processor-containing systems, or other systems that can fetch instructions and execute the instructions and/or otherwise manipulate data. Such instructions can be embodied in any computer-readable medium for use by or in connection with such systems, apparatuses, or devices. In the context of this document, a "computer-readable medium" may be any means that contain, store, communicate, propagate or transport instructions for use by or in connection with a system, apparatus, or device.

The computer readable medium may be, for example, an electronic, magnetic, optical, electromagnetic, infrared, or semi-conductor system, apparatus, device, or propagation medium, or other computer readable medium. More specific examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). Note that the computer-readable medium could even be paper or other suitable medium upon which the instructions are printed, as the instructions can be electronically captured via optical scanning of the paper or other medium, then compiled, interpreted, or otherwise processed in a suitable manner, if necessary, and then stored in memory.

Figure 4:
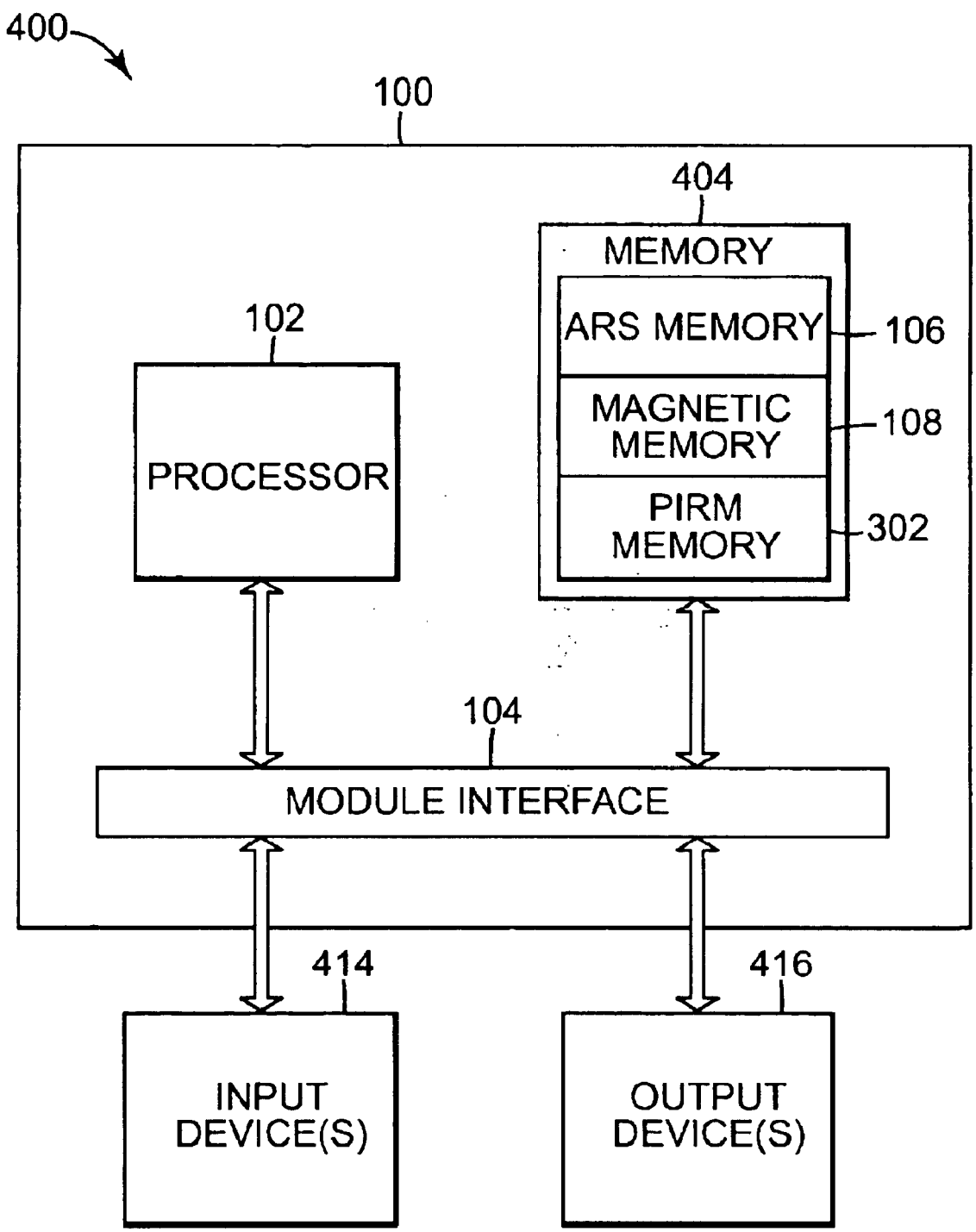
FIG. 4 is a block diagram illustrating an embodiment of a memory system including ARS memory, magnetic memory, PIRM, and a processor.

FIG. 4 is a block diagram illustrating a computer or processor-based system 400 that may employ one or more memory modules 100. Computer system 400 may generally comprise a memory module 100 that includes processor 102, memory 404, and module interface 104. Memory 404 includes ARS memory 106, which may be facilitated by ARS control logic (shown in FIGS. 2 and 3), magnetic memory 108, which may be facilitated by magnetic memory control logic (shown in FIGS. 2 and 3), and PIRM 302, which may be facilitated by PIRM control logic (shown in FIG. 3). In addition, an operating system (not shown), is provided in ARS memory 106 or PIRM 302. So configured, processor 102 accepts instructions and data from memory 404 over one or more interfaces, such as a bus or buses. For instance, processor 102 may accept instructions and/or data from memory 404 via module interface 104.

In one embodiment, system 400 is configured to provide a system on a chip. For example, PIRM 302 may be used as read once, write many (WORM) memory or ROM memory for storing the operating system and logic commands for system 400. Magnetic memory 108 may be used as RAM memory for storing data that gets overwritten frequently in system 400. ARS memory 106 may be used as a WORM memory for high capacity storage of data in a small form factor, such as for archiving data in system 400. By building a system that combines ARS memory, magnetic memory, PIRM, and a memory controller or processor and module interface (or various sub combinations thereof), system 400 can take advantage of the varying benefits of the different types of memory while providing a compact, low cost chip that can be used in a large number of applications.

In some embodiments, system 400 may include one or more input device(s) 414 and one or more output device(s) 416. Examples of input devices include a serial port, a keyboard, a mouse, a touch screen, a scanner, a local access network connection, etc. Examples of output devices include a video display, a speaker, a Universal Serial Bus, a printer port, etc. Generally, system 400 may run any of a number of different platforms and operating systems, such as HP-ux™, Linux™, Unix™, Sun Solaris™ or Windows™ operating systems.

What is claimed is:

1. A semiconductor memory module comprising:
   an atomic resolution storage memory;
   a magnetic memory;
   a memory controller configured to move data between the memory controller and the atomic resolution storage memory and configured to move data between the memory controller and the magnetic memory; and
   wherein the semiconductor memory module is formed on a single semiconductor device.

2. The semiconductor memory module of claim 1, wherein the memory controller is located on the semiconductor memory module.

3. The semiconductor memory module of claim 1, wherein the memory controller comprises software.

4. The semiconductor memory module of claim 1, wherein the memory controller comprises hardware.

5. The semiconductor memory module of claim 1, further comprising:
   a module interface coupled to the memory controller.

6. The semiconductor memory module of claim 5, wherein the module interface is configured to transfer data between the memory controller and an external device.

7. The semiconductor memory module of claim 5, wherein the module interface is configured to removably couple the semiconductor memory module to an external device.

8. The semiconductor memory module of claim 1, wherein the magnetic memory is a magnetic random access memory.

9. The semiconductor memory module of claim 1, wherein the atomic resolution storage memory comprises field emitters proximate a storage medium.

10. The semiconductor memory module of claim 9, wherein the atomic resolution storage memory comprises a mircromover for moving the field emitters relative to the storage medium.

11. The semiconductor memory module of claim 1, wherein the atomic resolution storage memory comprises probe tips proximate a storage medium.

12. The semiconductor memory module of claim 11, wherein the atomic resolution storage memory comprises a micromover for moving the probe tips relative to the storage medium.

13. A semiconductor memory chip comprising:
    a magnetic memory; and
    an atomic resolution storage memory comprising:
      a mover wafer comprising a storage medium, the storage medium comprising a plurality of storage areas, each of the storage areas being configurable in one of a plurality of states to represent information stored in the storage area; and
      a medium detection wafer arranged proximate the mover wafer, the medium detection wafer comprising a plurality of electron beam emitters configured to electrically communicate with the storage medium, the storage medium and the plurality of emitters being configured to move relative to each other such that each emitter may provide a beam of electrons to at least one of the storage areas of the storage medium.

14. The semiconductor memory chip of claim 13, further comprising:
    a memory controller to move data between the memory controller and the magnetic memory and configured to move data between the memory controller and the atomic resolution storage memory.

15. The semiconductor memory chip of claim 14, wherein the atomic resolution storage memory further comprises:
    a stator wafer arranged proximate the mover wafer.

16. The semiconductor memory chip of claim 15, wherein the stator wafer comprises the memory controller.

17. The semiconductor memory chip of claim 15, wherein the stator wafer comprises the magnetic memory.

18. The semiconductor memory chip of claim 15, further comprising:
    a housing at least partially enclosing the mover wafer, the medium detection wafer, and the stator wafer, the housing configured to maintain a spaced arrangement of the emitters of the medium detection wafer and the storage areas of the mover wafer.

19. The semiconductor memory chip of claim 14, wherein the magnetic memory comprises:
    an array of memory cells;
    word lines extending along rows of the array of memory cells; and
    bit lines extending along columns of the array of memory cells;
    wherein a memory cell is located at each cross-point of the word lines and bit lines and the memory controller is configured to move data between the memory controller and the magnetic memory cells via the word lines and bit lines.

20. The semiconductor memory chip of claim 13, wherein the mover wafer comprises a micromover configured such that the storage medium moves relative to the emitters of the medium detection wafer.

21. A memory module comprising:
    an atomic resolution storage (ARS) memory;
    a magnetic memory;
    a portable, inexpensive, rugged memory (PIRM); and
    a memory controller configured to move data between the memory controller and the ARS memory, the magnetic memory, and the PIRM.

22. The memory module of claim 21, wherein the ARS memory comprises:
    a mover wafer comprising a storage medium, the storage medium comprising a plurality of storage areas, each of the storage areas being configurable in one of a plurality of states to represent information stored in the storage area;
    a medium detection wafer arranged proximate the mover wafer, the medium detection wafer comprising a plurality of electron beam emitters configured to electrically communicate with the storage medium, the storage medium and the plurality of emitters being configured to move relative to each other such that each emitter may provide a beam of electrons to at least one of the storage areas of the storage medium; and
    a stator wafer arranged proximate the mover wafer.

23. The memory module of claim 22, wherein the PIRM is arranged proximate the stator wafer.

24. The memory module of claim 22, further comprising: a housing, wherein the PIRM is located on the housing.

25. The memory module of claim 21, wherein the PIRM comprises a plurality of integrated circuit layers constructed on plastic substrates.

26. A single memory module comprising:
    an ARS memory configured for write once data storage;
    a magnetic random access memory; and
    a processor configured to read data from and write data to the ARS memory and the magnetic random access memory.

27. The memory module of claim 26, further comprising:
a PIRM configured for read only access, wherein the processor reads data stored in the PIRM.

28. The memory module of claim 27, wherein the data stored in the PIRM comprises an operating system.

29. The memory module of claim 26, further comprising:
a module interface configured for transferring data between the ARS memory, the magnetic memory, and the processor.

30. The memory module of claim 29, wherein the interface transfers data between the processor and an external device.

31. A system comprising:
a semiconductor module comprising an atomic resolution storage memory, a magnetic memory, a PIRM, and a memory controller configured to transfer data between the memory controller and the atomic resolution storage memory, the magnetic memory, and the PIRM; and
at least one of an input device configured to provide data to the memory controller and an output device configured to output data from the memory controller.

32. The system of claim 31, wherein the input device and the output device are located in a common external device.

33. A semiconductor memory chip comprising:
a magnetic memory; and
an atomic resolution storage memory comprising:
a mover wafer comprising a storage medium, the storage medium comprising a plurality of storage areas, each of the storage areas being configurable in one of a plurality of states to represent information stored in the storage area; and
a medium detection wafer arranged proximate the mover wafer, the medium detection wafer comprising a plurality of probe tips configured to electrically communicate with the storage medium, the storage medium and the plurality of probe tips being configured to move relative to each other such that each probe tip may provide a probe to at least one of the storage areas of the storage medium.

34. The semiconductor memory chip of claim 33, further comprising:
a memory controller to move data between the memory controller and the magnetic memory and configured to move data between the memory controller and the atomic resolution storage memory.

35. The semiconductor memory chip of claim 33, wherein the atomic resolution storage memory further comprises:
a stator wafer arranged proximate the mover wafer.

36. The semiconductor memory chip of claim 35, wherein the stator wafer comprises the memory controller.

37. The semiconductor memory chip of claim 35, wherein the stator wafer comprises the magnetic memory.

38. The semiconductor memory chip of claim 35, further comprising:
a housing at least partially enclosing the mover wafer, the medium detection wafer, and the stator wafer, the housing configured to maintain a spaced arrangement of the probe tips of the medium detection wafer and the storage areas of the mover wafer.

39. The semiconductor memory chip of claim 34, wherein the magnetic memory comprises:
an array of memory cells;
word lines extending along rows of the array of memory cells; and
bit lines extending along columns of the array of memory cells;
wherein a memory cell is located at each cross-point of the word lines and bit lines and the memory controller is configured to move data between the memory controller and the magnetic memory cells via the word lines and bit lines.

40. The semiconductor memory chip of claim 33, wherein the mover wafer comprises a micromover configured such that the storage medium moves relative to the probe tips of the medium detection wafer.

* * * * *